Sept. 1, 1964   A. J. WALLNER ETAL   3,146,882
PRESSURE-SENSITIVE ADHESIVE TAPE WITH
ANTISTATIC PRIMER COATING
Filed Sept. 12, 1961

HYDROPHOBIC INSULATIVE FILM BACKING.

ANTISTATIC PRIMER COATING COMPRISED OF A BLEND OF INSULATING BONDING MATERIAL AND HYDROPHILIC IONOGENIC POLYMER WHICH IS CONDUCTIVE IN PRESENCE OF HUMID ATMOSPHERE.

WATER-INSOLUBLE INSULATIVE VISCOELASTIC PRESSURE-SENSITIVE ADHESIVE COATING.

ANTISTATIC PRIMER PREVENTS ADHESIVE TAPE FROM BECOMING ELECTROSTATICALLY CHARGED WHEN UNWOUND FROM ROLL AND SEVERED (AS WOULD OCCUR IN ABSENCE OF THE CONDUCTIVE POLYMER).

INVENTORS
ALFRED J. WALLNER
CRAIG A. STERLING
BY
Carpenter, Abbott, Coulter & Kinney
ATTORNEYS

3,146,882
PRESSURE-SENSITIVE ADHESIVE TAPE WITH ANTISTATIC PRIMER COATING
Alfred J. Wallner, Roseville, and Craig A. Sterling, St. Paul, Minn., assignors to Minnesota Mining and Manufacturing Company, St. Paul, Minn., a corporation of Delaware
Filed Sept. 12, 1961, Ser. No. 137,531
4 Claims. (Cl. 206—59)

This invention relates to an improvement in prior pressure-sensitive adhesive tape of the type which has a thin hydrophobic film backing coated with an aggresively tacky water-insoluble viscoelastic pressure-sensitive adhesive and is wound upon itself in roll form. The tape may include a primer coating located between the film and the adhesive layer, and may include a low-adhesion backsize coating on the back side of the film.

Such prior type of tape is electrically insulating as to all layers. When a length of such tape is unwound from the roll and severed, the resultant piece of tape is found to be electrostatically charged. The charged piece of tape is often difficult to handle, particularly if relatively long, since its charged state results in attraction to neighboring objects and in a tendency to twist and curl. The thinner the tape, the greater the difficulty in handling.

It has been unexpectedly discovered that this static propensity can be overcome by utilizing a thin antistatic primer coating (located between the backing film and the adhesive layer) which is so compounded as to have substantial electrical conductivity. This improvement can be employed without weakening the internal strength of the tape; the tape being unwindable from the roll without delamination or offsetting of adhesive. Antistatic primers can be used which do not interfere with the desired transparency of transparent tape constructions, and in fact the presence of the antistatic primer may be undetectable upon ordinary visual inspection due to its thinness and transparency.

See the accompanying drawing which is a diagrammatic representation of the present tape and illustrates the structure wherein an antistatic conductive primer coating is located between the insulative backing film and the insulative pressure-sensitive adhesive coating; this novel adhesive tape being described in more detail hereinafter.

The use of conductive antistatic surface coatings and sizings has long been known in the textile art, and in arts employing films, such as the photographic film art. The surface treatment of static-generating fibers and films has minimized formation and retention of static charges generated by friction or rubbing. This simple expedient is not in general adaptable to the manufacture of commercial pressure-sensitive adhesive tape of the type described; particularly transparent tape having hydrophobic back and face surfaces. The application of an antistatic agent to either of the exposed surfaces of the tape will interfere with the adhesive action and the unwinding properties. Incorporation of an antistatic agent in the adhesive composition will result in an inferior adhesive.

The present invention avoids such difficulties since it does not involve any alteration of the film backing or of the pressure-sensitive adhesive layer. It is not apparent why the inclusion of the present antistatic primer is actually successful in permitting tape to be unwound from the roll without being statically charged to an objectionable degree, since this extremely thin primer coating is sandwiched between a film layer and an adhesive layer which are both of a highly insulating dielectric nature.

Examples of such insulating and hydrophobic backing films are the well-known cellulose acetate films, polyester films, and rigid polyvinyl chloride films. These may carry a hydrophobic insulative low-adhesion backsize coating which serves to reduce the force required to unwind the adhesive tape from the roll (cf., U.S. Patents No. 2,532,011 issued November 28, 1950, and No. 2,607,711 issued August 19, 1952).

Examples of normally and aggressively tacky, hydrophobic, insulative, viscoelastic pressure-sensitive adhesives are the well-known rubber-resin adhesives (compounded of natural or synthetic rubber and a tackifier resin), and high polymers which are inherently of this adhesive type such as certain polyacrylates and certain polyvinyl alkyl ethers.

Anatistatic primers of the present invention are polymeric compositions selected so as to possess the usual characteristics needed in a primer: namely a resilient highly-cohesive film-forming ability and an ability to form a strong bond to both the backing film and the adhesive layer so that the tape can be unwound from the roll without delamination or offsetting of adhesive. A wide variety of ordinary primer materials are available and selection is made, as is well understood in the art, with reference to the particular film and particular adhesive to be employed. The present antistatic primer is preferably provided by blending with such a normal insulating primer coating composition a minor proportion by weight of a suitable antistatic polymer which does not seriously impair the priming function of the ultimate primer coating as indicated above.

A suitable antistatic agent is a hydrophilic film-forming ionogenic polymer which provides ionic conductivity in the presence of moisture and which is itself capable of maintaining an adequate moisture content under varying normal atmospheric conditions of about 20% relative humidity and higher to which tape rolls are exposed prior to and during use. Atmospheric moisture is accessible through the exposed edges of the wound tape. The antistatic polymer itself possesses cohesive strength and is compatible with the other and major polymeric content of the primer. Excessive moisture absorption is undesirable as it would result in seriously impairing the primer function, especially when the tape rolls are exposed to high humidity atmospheres. Insufficient moisture absorption is undesirable as the primer would dry out excessively and lose the needed ionic conductivity when the tape rolls are exposed to low humidity atmospheres.

It has been found that a primer coating which has an electrical resistivity of the order of not more than $10^{10}$ ohms per square, measured when in equilibrium with air having a 50% relative humidity, is most desirable. This value is of the same order as the resistivity of a plain (non-moistureproofed) cellophane film. Selection of suitable antistatic polymers for incorporation in the primer is facilitated by making up sample formulations, coating in primer thickness on an insulating film or surface, and measuring electrical resistivity. The usual primer coating thickness is less than 5 microns and may be less than 1 micron.

The presently preferred antistatic polymers are ionizable organic polymer salts, which have a hydrocarbon backbone and attached salt groups. These polymers are only slightly soluble in water but are rendered hydrophilic and ionogenic by the salt groups. Suitable examples are illustrated by the sodium salts of sulfonated polymers such as the sodium salts of sulfonated polystyrene, sulfonated polyvinyltoluene, sulfonated polystyrene-butyl acrylate copolymers, and polybenzyl sulfonate. Another preferred class is the quaternary polymer salts such as dimethylaminoethyl methacrylate homopolymer or its copolymer with butyl acrylate, and poly-4-vinyl pyridine, quaternized (95 to 100%) with methyl bromide or allyl chloride.

Example

A transparent cellulose acetate backing film of 1.7 mils thickness was squeeze-roll coated with the primer coating solution in a coating weight adapted to provide an extremely thin dried coating (less than 5 micron) having a dry solids weight of the order of 5 pounds per thousand square yards, and was hot-can dried at 110–135° F. for about 10 seconds. This primer solution was a 9½% by weight solution of a blend of two parts of a 30:70 copolymer of vinyl pyrrolidone and vinyl acetate and one part of the sodium salt of sulfonated polyvinyl toluene, dissolved in a mixture of water and isopropanol (2:1 ratio).

The dried primed film was provided on the back (unprimed) surface with a polyvinyl N-octadecyl carbamate low-adhesion backsize in a dry coating weight of about 5 pounds per thousand square yards (see U.S. Patent No. 2,532,011).

The primed face of the film was provided with a pressure-sensitive adhesive coating of a 95.5:4.5 copolymer of isooctyl acrylate and acrylic acid in a coating weight of about 40 pounds per thousand square yards (see U.S. Patent Reissue No. 24,906).

The web was then slit and wound into rolls of desired size.

This tape product exhibited little or no static problem when unwound from rolls that had been exposed to atmospheres of 20% relative humidity and higher. In contrast, tape made in the same way but without inclusion of the sulfonated polyvinyl toluene salt in the primer exhibited marked static effects when unwound from the roll. A strip of the latter tape when held over the edge of a sheet of paper caused the paper to jump up and stick to the tape, making it difficult to properly position the tape for adherence to the paper. Strips of such tape mutually repelled each other when held near one another. Cigarette ashes could be lifted from an ash tray due to the static effect.

The differences were even more marked in the cases of tapes made as above but having thin polyvinyl chloride backing films or thin polyester backing films (e.g., "Mylar" films sold by duPont).

Similar preferred constructions using these various films and the same backsizing and adhesive compositions have been made wherein the primer had the same composition except that use was made of the sodium salt of sulfonated polystyrene, or of diethylaminoethyl methacrylate quaternized with methyl bromide or allyl chloride. These tape products all exhibited a lack of static when unwound from the roll.

A further illustration of a suitable antistatic primer employed in making the tape having a rigid polyvinyl chloride backing film is a 50:50 blend of polyvinyl methyl ether and the sodium salt of sulfonated vinyl toluene, employed in conjunction with the backsize and the adhesive specified in the above example.

We claim:

1. A pressure-sensitive adhesive tape wound upon itself in roll form and having a water-insoluble hydrophobic insulative viscoelastic normally and aggressively tacky pressure-sensitive adhesive coating firmly united by an interposed primer coating to a hydrophobic insulative film backing having a hydrophobic insulative back surface in removable adherent contact with the outer surface of said adhesive coating in the wound roll, such that removal of a piece of tape tends to cause objectionable electrostatic charging thereof, said interposed primer coating providing antistatic means to prevent objectionable static in pieces of tape unwound from the roll and being formed of an extremely thin coating of a resilient highly-cohesive polymeric film composition adapted to provide a strong bond between the backing film and the adhesive coating and including a hydrophilic film-forming ionogenic polymer adapted to provide ionic conductivity and to maintain an adequate but not excessive moisture content when the tape roll is exposed to an atmosphere having a relative humidity of at least 20%, said ionogenic polymer being selected and proportioned to provide said primer coating with an electrical resistivity of the order of not more than $10^{10}$ ohms per square when measured in equilibrium with air having a 50% relative humidity, but without impairment of the bonding function of the primer coating.

2. An adhesive tape according to claim 1 which is a transparent tape wherein the antistatic primer coating has a thickness of less than 5 microns and is undetectable upon ordinary visual inspection due to its thinness and transparency.

3. An adhesive tape according to claim 1 wherein said ionogenic polymer of the primer coating is an ionizable organic polymer salt which is only slightly soluble in water.

4. An adhesive tape according to claim 2 wherein said ionogenic polymer of the primer coating is an ionizable organic polymer salt which is only slightly soluble in water.

References Cited in the file of this patent

UNITED STATES PATENTS

| | | |
|---|---|---|
| 2,739,083 | Brown et al. | Mar. 20, 1956 |
| 2,808,352 | Coleman et al. | Oct. 1, 1957 |
| 2,972,535 | Laakso et al. | Feb. 21, 1961 |
| 3,075,853 | Striker et al. | Jan. 29, 1963 |